(12) United States Patent
Stefan et al.

(10) Patent No.: US 10,363,960 B2
(45) Date of Patent: Jul. 30, 2019

(54) METHOD AND DEVICE FOR ASSISTING A MANEUVERING PROCESS OF A MOTOR VEHICLE

(71) Applicant: FORD GLOBAL TECHNOLOGIES, LLC, Dearborn, MI (US)

(72) Inventors: Frederic Stefan, Aachen NRW (DE); Christoph Arndt, Moerlen Rheinland-Pfalz (DE); Uwe Gussen, Huertgenwald NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 145 days.

(21) Appl. No.: 15/344,687

(22) Filed: Nov. 7, 2016

(65) Prior Publication Data

US 2017/0129538 A1    May 11, 2017

(30) Foreign Application Priority Data

Nov. 6, 2015    (DE) .......................... 10 2015 221 867

(51) Int. Cl.
| | |
|---|---|
| *B62D 15/02* | (2006.01) |
| *G05D 1/00* | (2006.01) |
| *B60W 30/06* | (2006.01) |
| *G01C 21/00* | (2006.01) |
| *G05D 1/02* | (2006.01) |

(52) U.S. Cl.
CPC ......... *B62D 15/0285* (2013.01); *B60W 30/06* (2013.01); *G01C 21/00* (2013.01); *G05D 1/0088* (2013.01); *G05D 1/0217* (2013.01); *G05D 2201/0213* (2013.01)

(58) Field of Classification Search
CPC ........................... B62D 15/0285; B60W 30/06
See application file for complete search history.

(56) References Cited

U.S. PATENT DOCUMENTS

| | | | |
|---|---|---|---|
| 8,497,782 B2 | 7/2013 | Barth et al. | |
| 2006/0190147 A1* | 8/2006 | Lee .................... | B62D 15/0275 701/26 |
| 2006/0206623 A1* | 9/2006 | Gipps ................... | G06Q 10/04 709/238 |

(Continued)

FOREIGN PATENT DOCUMENTS

| | | |
|---|---|---|
| CN | 102963355 A | 3/2013 |
| DE | 102007055391 A1 | 5/2009 |

(Continued)

OTHER PUBLICATIONS

German Search Report dated Aug. 12, 2016 for German Application No. 102015221867.8, 6 pgs.

*Primary Examiner* — Adam R Mott
(74) *Attorney, Agent, or Firm* — Brooks Kushman P.C.; Frank Lollo

(57) ABSTRACT

A maneuvering process of a motor vehicle is assisted in at least partially automated fashion from a present position into a target position. A multiplicity of possible trajectories from the present position into the target position are determined. One of said trajectories is defined as the trajectory to be followed by the vehicle during the maneuvering process on the basis of a predefined criterion. The definition is performed repeatedly during the execution of the maneuvering process, with the trajectory to be followed being updated in each case.

11 Claims, 7 Drawing Sheets

(56) References Cited

U.S. PATENT DOCUMENTS

| | | | |
|---|---|---|---|
| 2010/0324817 A1* | 12/2010 | Hansen | G01C 21/3415 |
| | | | 701/414 |
| 2013/0046441 A1 | 2/2013 | Marczok et al. | |
| 2013/0325325 A1* | 12/2013 | Djugash | G01C 21/3415 |
| | | | 701/425 |
| 2013/0335553 A1* | 12/2013 | Heger | B62D 15/0285 |
| | | | 348/118 |
| 2014/0057237 A1 | 2/2014 | Chen | |
| 2016/0185389 A1* | 6/2016 | Ishijima | B62D 15/0285 |
| | | | 701/41 |

FOREIGN PATENT DOCUMENTS

| | | |
|---|---|---|
| DE | 102013015348 A1 | 4/2014 |
| DE | 102013225057 A1 | 6/2015 |
| WO | 2011029693 A1 | 3/2011 |
| WO | 2013138033 A1 | 9/2013 |

* cited by examiner

METHOD AND DEVICE FOR ASSISTING A MANEUVERING PROCESS OF A MOTOR VEHICLE

CROSS-REFERENCE TO RELATED APPLICATIONS

This application claims foreign priority benefits under 35 U.S.C. § 119(a)-(d) to DE 10 2015 221 867.8 filed Nov. 6, 2015, which is hereby incorporated by reference in its entirety.

TECHNICAL FIELD

The present disclosure relates to a method and a device for assisting a maneuvering process of a motor vehicle.

BACKGROUND

According to the disclosure, provision is made in particular of a functionality for planning a path or trajectory during the movement of a motor vehicle from a starting position into a target position (parking position) situated in the vicinity of said starting position, that is to say for trajectory planning along a relatively short distance.

With the advancing development of parking assistance devices, systems are provided that make it possible for a vehicle to be maneuvered, with partial or full automation, into a parking position. The respective parking maneuvers are performed by driver assistance devices of said type with varying levels of automation. For example, some devices are capable only of performing parking maneuvers parallel to the roadway, whereas other devices can also perform parking maneuvers perpendicular to the roadway. Further devices are capable of moving a vehicle out of a parked position, and further devices are suitable for parking in a garage and exiting a garage from a parked position.

In general, parking assistance devices of said type typically operate on the basis of a similar principle. Firstly, a data capture phase enables a target position (adhering to certain dimensions) to be identified. The data capture in said phase of exploration of the surroundings generally makes it necessary for the surroundings to be sensed or scanned by the vehicle. In a subsequent planning phase, a suitable trajectory or path for reaching the target position is calculated. The calculated path is thereupon converted, in a maneuvering phase, into corresponding set point values for the lateral and/or longitudinal control. Here, some systems are also capable of monitoring the respective surroundings and, if appropriate, modifying the originally planned trajectory in order to be able to react to an obstruction appearing along the trajectory. Finally, the maneuver is ended if either the target position has been reached or a termination scenario has arisen.

Here, in the planning phase, the calculation of the trajectory is performed taking into consideration only certain predefined problems or specifications (for example the calculation of a trajectory for reverse parking into a parking space arranged parallel to the roadway). Here, there is a demand for more general or more universal planning, possibly also taking into consideration additional data, in order to be able to take into consideration a greater number of parking scenarios. For example, in practice, scenarios may arise in which a driver wishes to maneuver the vehicle into certain target positions not offered by the parking assistance device presently being used. In further scenarios, it may be desired to maneuver the vehicle into a parking position that is oriented neither parallel nor perpendicular, but obliquely with respect to the roadway. In further possible scenarios, the driver may wish to modify the end position of the vehicle in the respective parking space.

With regard to the prior art, reference is made by way of example to DE 10 2007 055 391 A1, WO 2011/029693 A1, US 2014/0057237 A1, US 2013/0046441 A1 and CN 102963355.

SUMMARY

It is an object of the present disclosure to provide a method and a device for assisting a maneuvering process of a motor vehicle, wherein the motor vehicle is maneuvered in at least partially automated fashion from a present position into a target position, wherein a reliable maneuvering process is made possible for a greater variety of different parking scenarios.

A method for assisting a maneuvering process of a motor vehicle, wherein the motor vehicle is maneuvered in at least partially automated fashion from a present position into a target position, has the following steps:
  determining a multiplicity of possible trajectories from the present position into the target position; and
  defining one of said trajectories as the trajectory to be followed by the vehicle during the maneuvering process on the basis of a predefined criterion, wherein said definition is performed repeatedly during the execution of the maneuvering process, with the trajectory to be followed being updated in each case.

The disclosure is based in particular on the concept of realizing the maneuvering of a motor vehicle from a starting position into a target position situated in the vicinity of the starting position using universal trajectory planning, which is independent of a predefined parking layout. Here, in the case of the trajectory planning according to the disclosure, the identification of a path is possible on the basis of all possible trajectories, existing boundary conditions of the surroundings and boundary conditions or restrictions on the part of the respective vehicle, wherein the optimum trajectory is determined or selected so as to minimize a cost or expenditure function with regard to a series of parameters. Here, the optimum trajectory is continuously monitored, and if the margin between the present trajectory and the optimum trajectory becomes significant, a new optimum trajectory is selected. In embodiments of the disclosure, the optimum trajectory may also be stored in order, by way of a learning algorithm, to solve particular parking problems and use the relevant information for the initialization of future trajectory planning.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
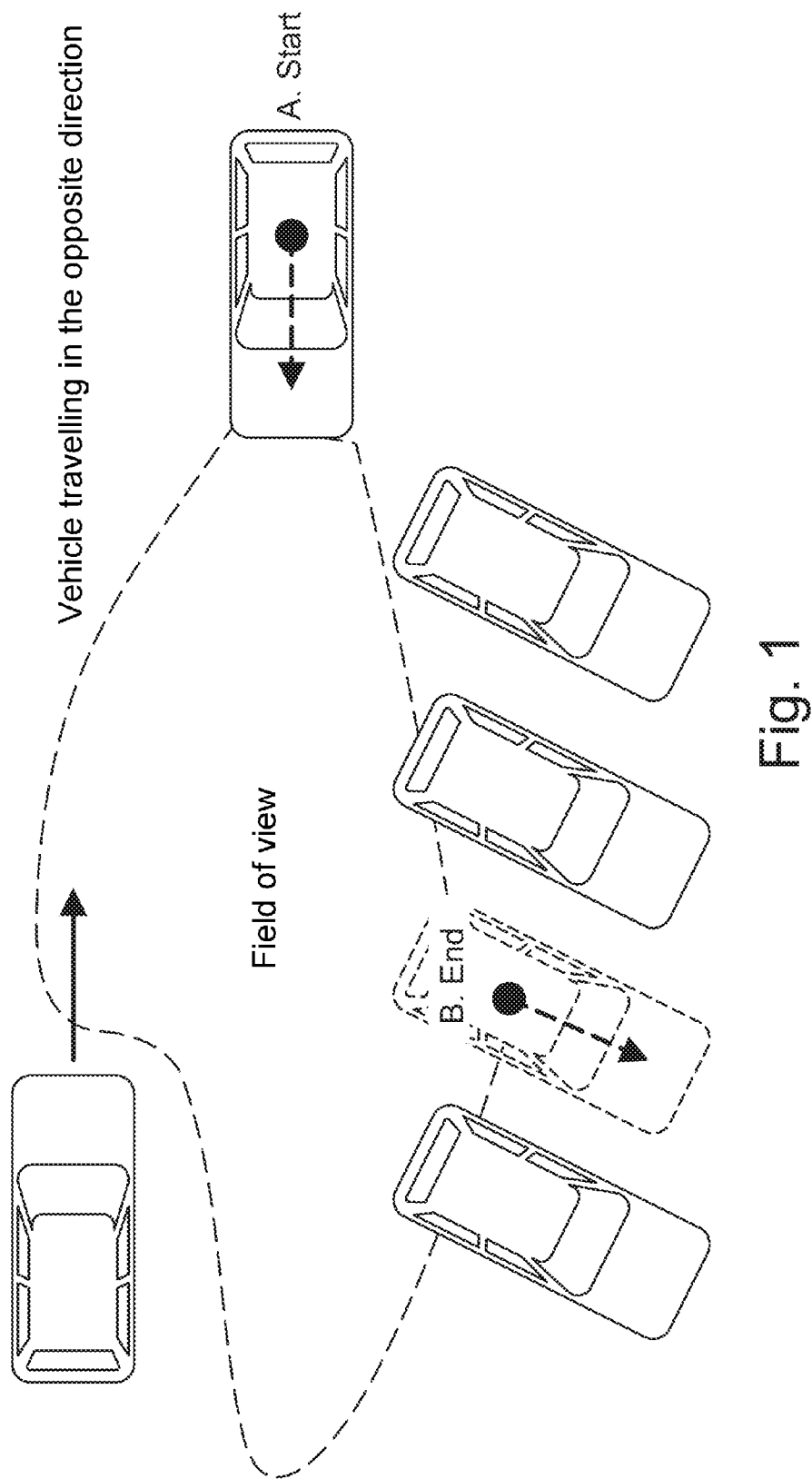
FIGS. 1 to 4 are schematic illustrations showing different phases during the execution of the method according to the disclosure.

With reference to FIG. 1, with a method according to the disclosure or by way of the device according to the disclosure, in one embodiment, a determination of the present vehicle position and orientation and a determination of the target position and orientation are performed (wherein the corresponding target data may be obtained by virtue of the surroundings being captured by the motor vehicle, may be transmitted to the respective vehicle from external systems such as an existing infrastructure or from another motor vehicle, and/or may be input by the driver).

If the target position is situated too far away, the driver may initially be requested to drive closer to the target position, or the motor vehicle may be driven closer to the target position autonomously. It may also be determined whether the device has sufficient information regarding the target position and regarding the path from the present position to the target position, wherein, otherwise, the capturing of the surroundings can be refined in a search phase.

Figure 2:
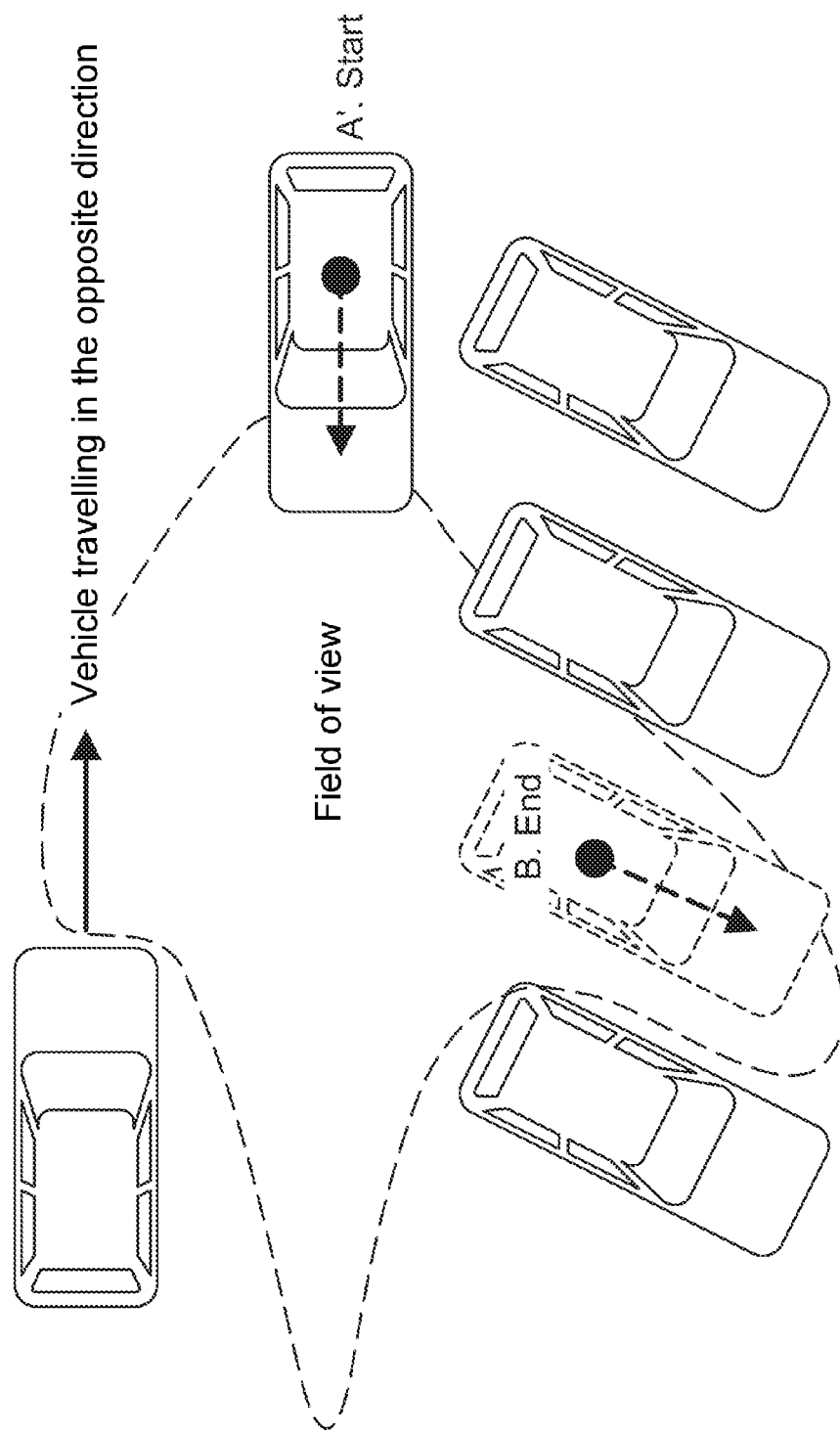

In the example of FIG. 1, in the starting position "A", it is not possible for the driver of the motor vehicle to have a complete overview of the target position "B". Accordingly, a short search and capturing phase is planned. Here, the vehicle sensors are made capable of obtaining a maximum amount of additional information regarding the surroundings. In the situation of FIG. 1, it is expedient for the motor vehicle to be moved forward slightly. FIG. 2 shows the motor vehicle in an end position "A'" of the search phase, in which the motor vehicle has collected all of the required information. The position "A'" also forms the new starting position for the parking maneuver.

In this phase, it is also possible for the motor vehicle to be moved autonomously onward along the search path, and in particular back to the initial state, in order to obtain additional information.

In a subsequent step, a maneuvering region is determined. This is a region in which the motor vehicle can maneuver and may be regarded as the sum of all possible trajectories. The determination of the maneuvering region is performed taking into consideration the following external parameters:
- starting position, end position and/or orientation of the motor vehicle executing the maneuvering process;
- presence of physical obstructions (e.g., a wall, other vehicle, etc.) and/or virtual obstructions (e.g., roadway marking, region with thoroughfare restriction, etc.) in the surroundings of the motor vehicle;
- presence of regions in the surroundings of the motor vehicle that cannot be captured by sensors of the motor vehicle (e.g., regions concealed by a physical obstruction);
- turning capabilities of the motor vehicle;
- dimensions of the motor vehicle; and
- predefined border region (e.g., 40 centimeters (cm)) around the motor vehicle in which no obstruction should be present regardless of the trajectory traveled through (without taking into consideration moving objects that may appear in said region).

In further embodiments, consideration may also be given to additional boundary conditions such as the maximum speed or acceleration, vehicle restrictions (turning radius, engine type, brake system) or the presence or absence of a driver in the motor vehicle.

Figure 3:
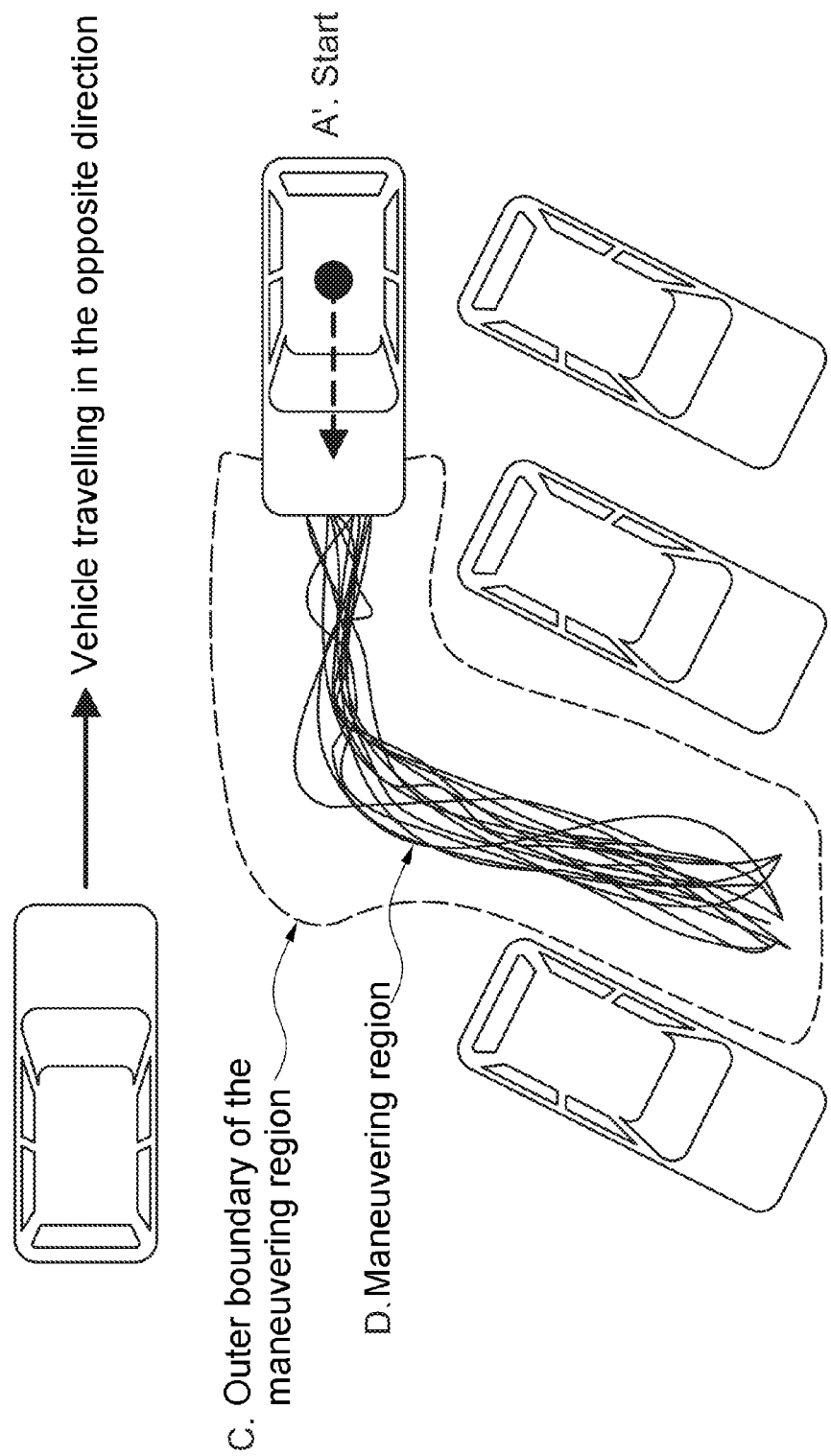

FIG. 3 shows, in a schematic illustration, an exemplary maneuvering region together with its outer boundary. The outer boundary of the maneuvering region in which a group of possible trajectories is contained may also be regarded as a specification for a particular parking problem that must be solved by the device according to the disclosure.

In a subsequent step, an optimum trajectory is determined from the maneuvering region. Here, a cost or expenditure function may be defined for each trajectory taking into consideration the following parameters:
- driving time required for the maneuvering process in accordance with the trajectory;
- driving distance required for the maneuvering process in accordance with the trajectory;
- energy expenditure required for executing the maneuvering process in accordance with the trajectory;
- minimum spacing, which results during execution of the maneuvering process in accordance with the trajectory, of the motor vehicle to objects situated in the surroundings; and
- number of direction changes required for the maneuvering process in accordance with the trajectory.

The trajectory which leads to a minimization of the cost or expenditure function is selected as optimum trajectory.

In the next step, the optimum trajectory is selected by the device according to the disclosure and is converted into corresponding lateral control (e.g., steering wheel angle) and longitudinal control (e.g., setpoint value for the vehicle speed).

In the next step, the present trajectory is monitored by the device. Here, the optimum trajectory from the maneuvering region is calculated continuously with regard to the new vehicle position and any new data detected by the vehicle sensors. If the distance between the present trajectory and the new optimum trajectory overshoots a threshold value, the device according to the disclosure can decide to continue the maneuver with said new trajectory.

Figure 4:
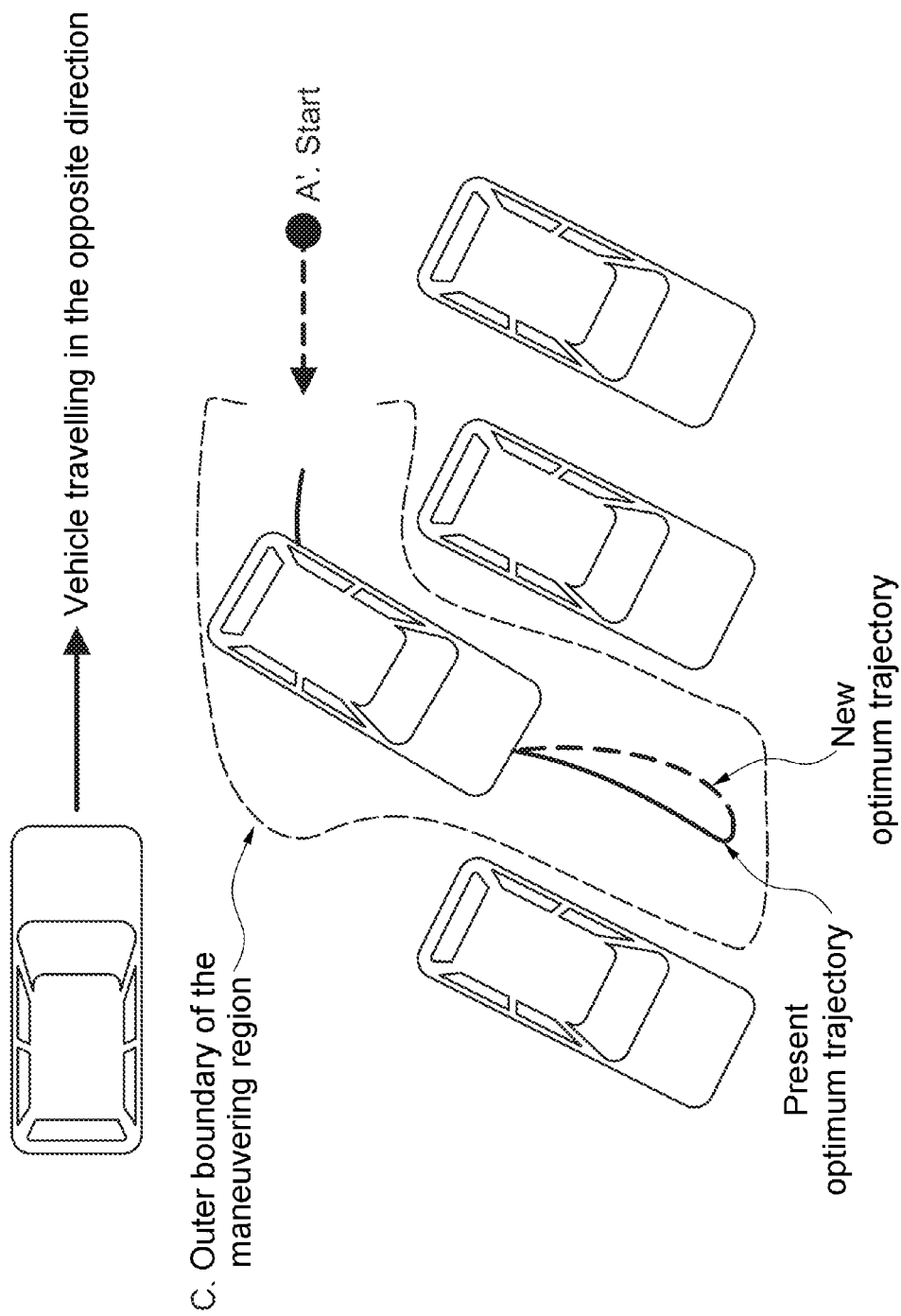

FIG. 4 shows, in a schematic illustration, a situation in which the motor vehicle performing the parking process is following a presently optimum trajectory (illustrated by a solid line). Here, however, the device according to the disclosure detects that the distance between the present trajectory and the new optimum trajectory overshoots a predefined threshold value. Accordingly, the present trajectory is modified by the device.

During the maneuver, the device also monitors objects that cross the external boundary of the maneuvering region or enter into the maneuvering region. If this occurs, the motor vehicle can be braked or stopped by the device. Here, the following situations, for example, are possible:
- The object exits the external boundary of the maneuvering region, and the device continues the maneuver as normal.
- The object remains within the external boundary of the maneuvering region (e.g., beyond a predefined time duration), in which case the trajectory can be newly calculated and correspondingly modified.
- The object remains within the external boundary of the maneuvering region and prevents the device from correctly completing the parking maneuver. In this case, the method according to the disclosure is terminated.

The device is furthermore designed to be "adaptive" insofar as it is capable of storing trajectories traveled in the past and taking these into consideration with regard to the external boundary of the maneuvering region. The external boundary may be regarded as a dataset which contains all of the features of a specific parking problem. Here, the device may draw comparisons with a present parking problem in order to realize a solution to the problem using solutions to similar problems in the past. This is conducive to improving the initialization of the maneuvering region, improving the determination of the optimum trajectory and, if a similar situation arises in future, calculating an optimum trajectory more quickly.

Furthermore, the device is preferably capable of communicating or exchanging data with the driver. For example, the driver may be capable of activating and controlling the device. Furthermore, the device may inform the driver regarding the status of the maneuver and regarding any special occurrences.

Figure 5:
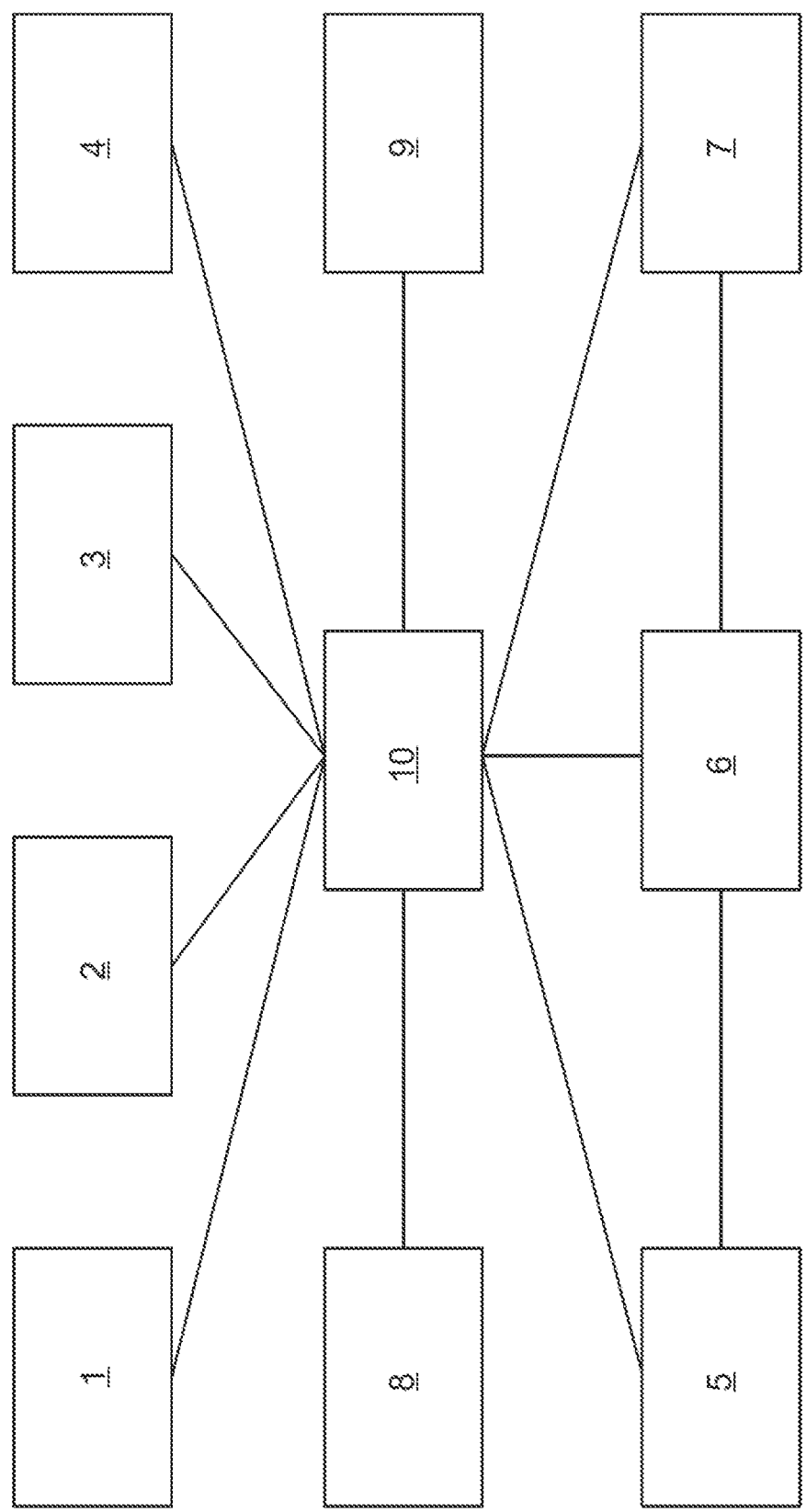
FIG. 5 shows an overview diagram with components of the device according to the disclosure.
Figure 6:
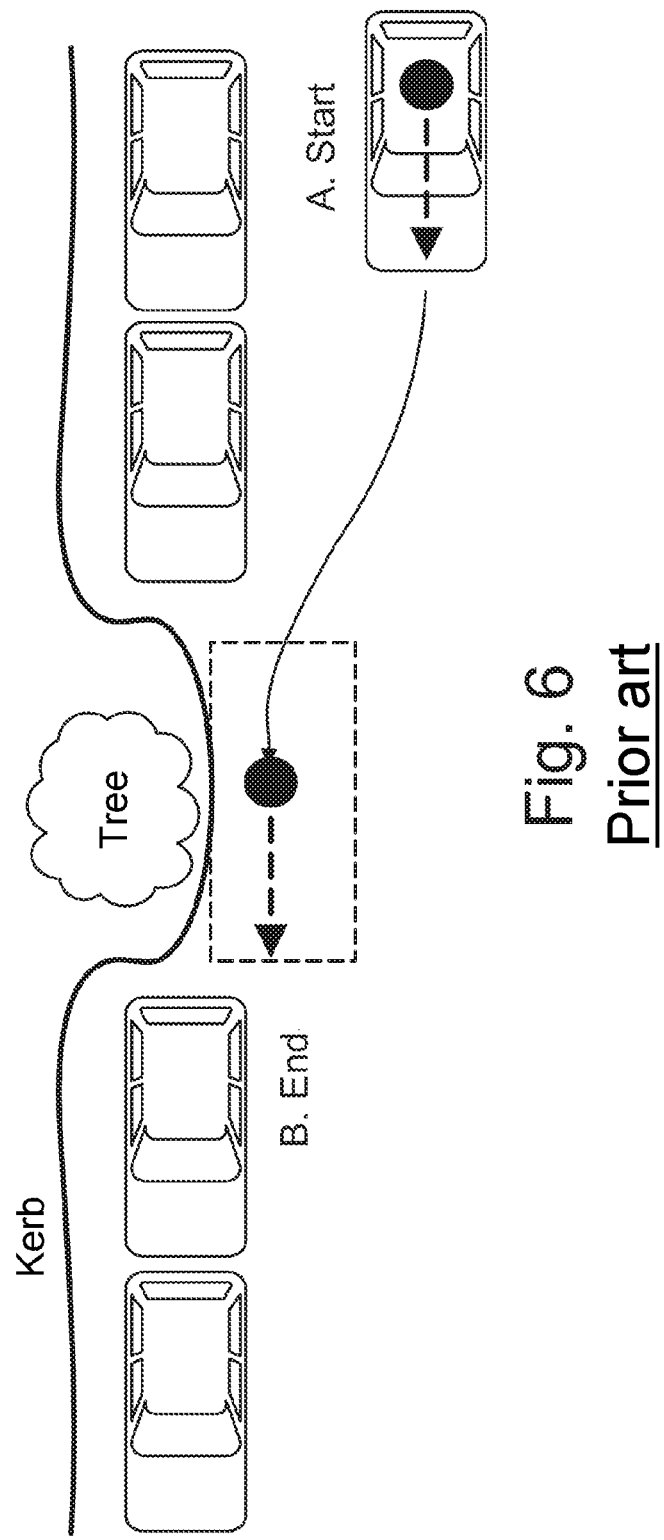
FIGS. 6 to 7 are schematic illustrations showing different scenarios that arise during the execution of maneuvering or parking processes.
Figure 7:
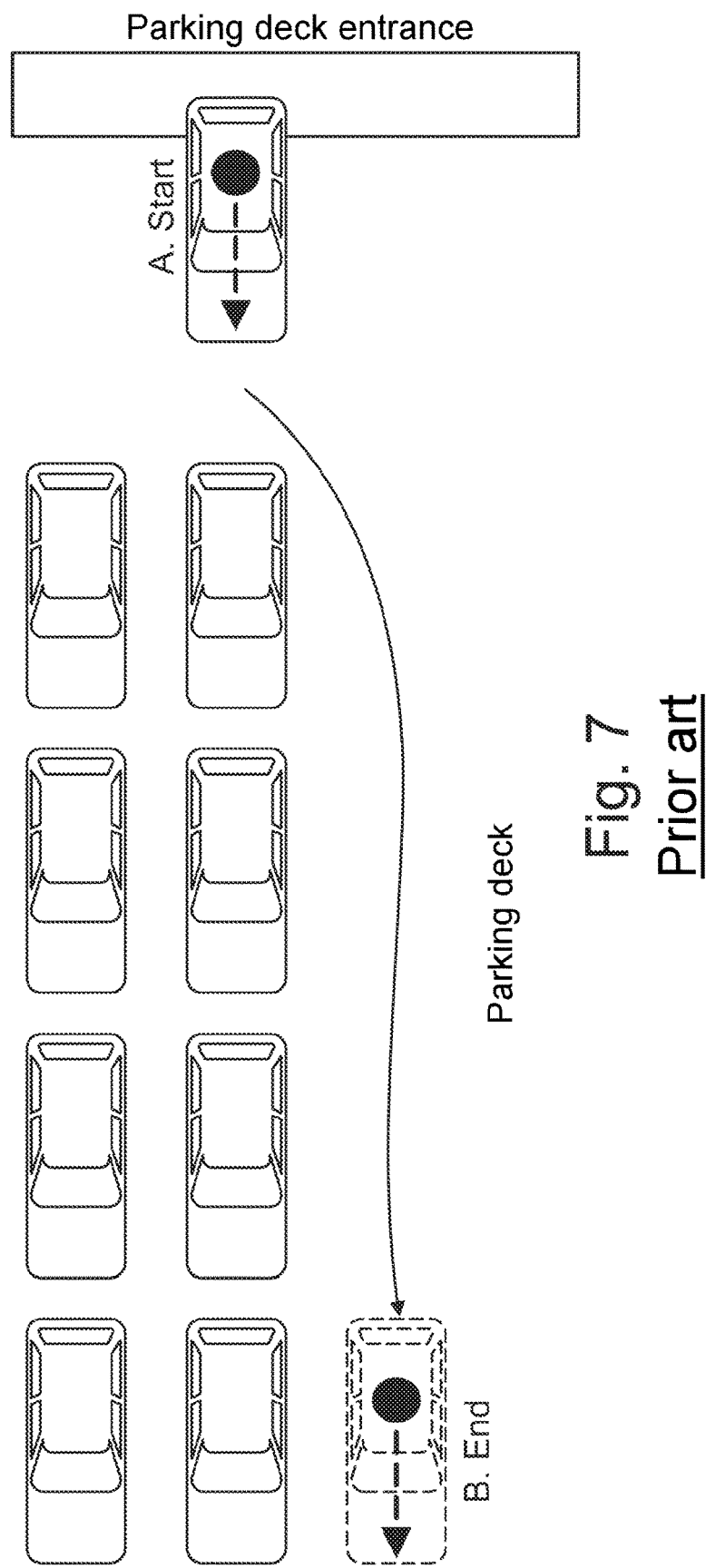

FIG. 5 shows an overview diagram with components of the device according to the disclosure.

The device according to the disclosure has a data capture unit 1, which serves for detecting the present position and orientation of the motor vehicle and the target position and orientation of the motor vehicle. A surroundings capture module 2 serves for capturing the surroundings of the motor vehicle. This may be performed for example using capturing sensors (ultrasound, radar, camera, laser etc.), wherein corresponding signal processing algorithms are used, and all data relevant for the parking maneuver can be derived.

"3" denotes a human-machine interface (HMI) which permits communication or an exchange of data between the driver and the device.

A module "4" serves for deciding whether the device has sufficient information to commence the planning of the parking maneuver. If this is not the case, the module 4 can plan a certain capturing or surroundings detection trajectory in order to make the device capable of collecting sufficient information regarding the surroundings and in particular all obstructions that can be detected by the vehicle sensors.

"5" denotes a module for calculating a maneuvering region. The module 5 calculates the different possible vehicle trajectories between the present position and orientation of the motor vehicle and the target position and orientation of the motor vehicle. Here, it is optionally possible for data of a memory module 7, which will be described below, to be utilized.

A module "6" serves for the determination of an optimum trajectory. The module 6 uses data from the module 5 and optionally also from the memory module 7. The module 6 continuously calculates the optimum path or the optimum trajectory.

The memory module "7" already mentioned above stores all parking situations that have been encountered in the past, and the respective optimum trajectories traveled.

A planning module "8" serves for the planning of the maneuvering process. The planning module 8 converts the optimum trajectories into setpoint values for the lateral and longitudinal vehicle control. The planning module 8 also monitors whether the motor vehicle is still situated on the optimum trajectory, wherein, if this is not the case, a change in the trajectory can be initiated. "9" denotes devices for the lateral and longitudinal control of the vehicle. "10" denotes a central control and coordination unit While exemplary embodiments are described above, it is not intended that these embodiments describe all possible forms of the disclosure. Rather, the words used in the specification are words of description rather than limitation, and it is understood that various changes may be made without departing from the spirit and scope of the disclosure.

Additionally, the features of various implementing embodiments may be combined to form further embodiments of the disclosure.

What is claimed is:

1. A method for assisting an automated maneuvering process of a motor vehicle, comprising:
    autonomously driving the motor vehicle during a maneuver from a first position into a target position along a first trajectory, the first trajectory selected based on a predefined criterion from a multiplicity of possible trajectories between the first position and the target position;
    monitoring a second trajectory from the multiplicity of possible trajectories based on the predefined criterion while the motor vehicle is autonomously driven along the first trajectory; and
    autonomously driving the motor vehicle along the second trajectory during the maneuver in response to a distance between the first trajectory and the second trajectory exceeding a threshold.

2. The method as claimed in claim 1, wherein the predefined criterion is at least one of:
    a driving time required for the maneuver in accordance with the associated trajectory;
    a driving distance required for the maneuver in accordance with the associated trajectory;
    an energy expenditure required for executing the maneuver in accordance with the associated trajectory;
    a minimum spacing, resulting from execution of the maneuver in accordance with the associated trajectory, of objects situated in a surrounding area; and
    a number of direction changes required for the maneuver in accordance with the associated trajectory.

3. The method as claimed in claim 2 further comprising:
    summing the multiplicity of possible trajectories to define a maneuvering region; and
    repeatedly selecting the second trajectory for monitoring within the maneuvering region based on the predefined criterion.

4. The method as claimed in claim 3, wherein the multiplicity of possible trajectories is determined inputting the following external parameters into a vehicle module:
    (i) a start position, an end position and a vehicle orientation;
    (ii) a presence of physical or virtual obstructions in a surrounding area;
    (iii) a presence of regions in the surrounding area;
    (iv) a vehicle turning capability;
    (v) a vehicle dimension; and
    (vi) a predefined border region wherein no obstruction should be present regardless of the trajectory defined.

5. The method as claimed in claim 1 further comprising:
    checking available information for defining the multiplicity of possible trajectories; and,
    in response to the checking, initiating a vehicle movement to gather additional information defining the multiplicity of possible trajectories prior to the maneuver.

6. The method as claimed in claim 5, wherein initiating a vehicle movement further includes autonomous driving of the motor vehicle.

7. The method as claimed in claim 1 further comprising storing past trajectories traveled by the motor vehicle in a memory,
    wherein the multiplicity of possible trajectories is determined by inputting the past trajectories into a vehicle module and inputting an external boundary of a maneuvering region for the motor vehicle into the vehicle module, the maneuvering region containing the target position.

8. The method of claim 1 further comprising selecting the second trajectory for monitoring based on (i) a present motor vehicle position during the maneuver, and (ii) obstruction data detected by at least one vehicle sensor during the maneuver.

9. The method of claim 1 wherein the motor vehicle is autonomously driven along an associated trajectory by converting the associated trajectory into setpoint values for lateral and longitudinal vehicle control.

10. The method of claim 1 further comprising defining a maneuvering region by summing the multiplicity of possible trajectories.

11. The method of claim 10, further comprising monitoring an external boundary of the maneuvering region using at least one vehicle sensor; and autonomously stopping the motor vehicle in response to the at least one vehicle sensor detecting an object crossing an external boundary of the maneuvering region.

\* \* \* \* \*